(12) United States Patent
Tani et al.

(10) Patent No.: US 8,204,638 B2
(45) Date of Patent: Jun. 19, 2012

(54) CONTROL APPARATUS FOR A HYBRID VEHICLE

(75) Inventors: Keisuke Tani, Anjo (JP); Akira Sakamoto, Kariya (JP); Kazunao Yamada, Okazaki (JP)

(73) Assignee: Denso Corporation, Kariya (JP)

( * ) Notice: Subject to any disclaimer, the term of this patent is extended or adjusted under 35 U.S.C. 154(b) by 612 days.

(21) Appl. No.: 12/481,874

(22) Filed: Jun. 10, 2009

(65) Prior Publication Data
US 2009/0319110 A1  Dec. 24, 2009

(30) Foreign Application Priority Data
Jun. 19, 2008 (JP) ................................. 2008-160902

(51) Int. Cl.
*G01F 19/00* (2006.01)
*B60L 11/02* (2006.01)
(52) U.S. Cl. ...... 701/22; 903/930; 180/65.21; 180/65.8; 340/461; 700/288
(58) Field of Classification Search .................... 701/99
See application file for complete search history.

(56) References Cited

U.S. PATENT DOCUMENTS

| | | | |
|---|---|---|---|
| 7,013,205 B1 * | 3/2006 | Hafner et al. ............... | 701/22 |
| 8,099,198 B2 * | 1/2012 | Gurin ........................ | 700/288 |
| 2007/0145924 A1 | 6/2007 | Obayashi | |

FOREIGN PATENT DOCUMENTS

| | | |
|---|---|---|
| EP | 1 920 986 | 5/2008 |
| JP | 2004-108342 | 4/2004 |
| JP | 2007-306656 | 11/2007 |
| JP | 2008-087719 | 4/2008 |

OTHER PUBLICATIONS

Japanese Office Action dated Jan. 12, 2010, issued in corresponding Japanese Application No. 2008-160902, with English translation.

* cited by examiner

*Primary Examiner* — Thomas G. Black
*Assistant Examiner* — Lin B Olsen
(74) *Attorney, Agent, or Firm* — Nixon & Vanderhye PC

(57) ABSTRACT

A control apparatus for a hybrid vehicle computes estimated energy and external charge energy. The estimated energy is required to drive a vehicle to travel a planned travel route and an EV priority mode, in which drive power for the vehicle is generated with priority by a motor/generator by supplying electric power from a battery to the motor/generator. The external charge energy is supplied from an electric power source. The control apparatus checks whether the estimated required energy will be supplied fully by the external charge energy. If the full supply is not possible, the control apparatus causes electric power generation by the motor/generator at some point in the planned travel route, where the efficiency of electric power generation is good, thereby to supplement insufficiency of energy.

8 Claims, 9 Drawing Sheets

CONTROL APPARATUS FOR A HYBRID VEHICLE

CROSS REFERENCE TO RELATED APPLICATION

This application is based on and incorporates herein by reference Japanese Patent Application No. 2008-160902 filed on Jun. 19, 2008.

FIELD OF THE INVENTION

The present invention relates to a control apparatus for a hybrid vehicle, which uses an internal combustion engine and a rotary electric machine as a drive power source of a vehicle. The present invention more particularly relates to a control apparatus for a hybrid vehicle, which is capable of charging an in-vehicle battery by an external electric power source.

BACKGROUND OF THE INVENTION

A conventional hybrid vehicle uses an internal combustion engine and a rotary electric machine such as an electric motor/generator as drive power sources. The hybrid vehicle is adapted such that an in-vehicle battery may be charged by an electric power source, which is external to the vehicle. In this hybrid vehicle, the in-vehicle battery is charged externally by plugging an electric connector connected to the in-vehicle battery through an electric cable into an electric power outlet of a home (external power supply source). Such a vehicle is referred to as a plug-in hybrid vehicle.

The electric power supplied from the external power source to the plug-in hybrid vehicle is for example commercially available power such as commercial home electric power. The home electric power is lower in cost than engine fuel such as gasoline. Therefore, the cost to be borne by a user can be reduced as the electric power supplied externally of the vehicle is used more in driving the vehicle. Further, the number of times of refilling fuel at gas stations can also be reduced.

According to a plug-in hybrid vehicle disclosed in patent document (EP 1920986 corresponding to JP 2007-62638A), the output power of an internal combustion engine is not used to drive a motor/generator for generation of electric power until a state-of-charge (SOC) of an in-vehicle battery falls below a predetermined reference level. Under this condition, the vehicle is driven to travel in an electric vehicle (EV) travel mode by stopping the engine and driving the motor/generator as a motor with electric power stored in the in-vehicle battery. Thus, the plug-in hybrid vehicle uses electric power supplied externally, that is, low-cost energy, with priority. The vehicle is driven in a hybrid vehicle (HV) travel mode by driving the motor/generator as a generator to generate electric power by using the output power of the engine, when the SOC falls below the predetermined reference level. Under this condition, the vehicle travels while repeating charging and discharging of the battery so that the SOC may be maintained between predetermined upper limit and lower limit.

The hybrid vehicle according to the patent document is driven in the HV travel mode only after it travels more than a certain distance with the electric power supplied by the external power source and the SOC of the battery falls below the predetermined reference level. That is, it is only after the SOC of the battery falls below the predetermined reference level, that the motor/generator is driven by the output power of the engine to generate electric power.

If the motor/generator is driven to generate electric power by the output power of the engine, it is preferred that the amount of fuel consumed by the engine to generate the electric power is as small as possible. The amount of fuel required to generate the electric power however varies with vehicle travel conditions such as drive power and travel speed of the vehicle.

If the HV travel mode is limited to only a case, in which the SOC becomes less than the predetermined reference level, the total cost of energy (fuel and electricity) required to vehicle travel will not be minimized. For instance, electric power will not be generated with smaller amount of fuel, if a planned travel route of a vehicle includes many areas in the former part of the planned travel route, where the electric power can be generated with high efficiency (low fuel consumption).

SUMMARY OF THE INVENTION

It is therefore an object of the present invention to reduce energy cost of a hybrid vehicle, in which an in-vehicle battery is chargeable with electric power supplied from an external electric power source.

According to one aspect of the present invention, a control apparatus is provided for a hybrid vehicle, which has an engine and a rotary electric machine as drive power sources, and an in-vehicle battery for supplying and receiving electric power to and from the rotary electric machine. The control apparatus computes external charge energy supplied as electric power from an external electric power source, and computes estimated required energy estimated as required for the hybrid vehicle to travel a planned travel route in a priority mode, in which electric drive of the hybrid vehicle is performed by the rotary electric machine by supplying the electric power from the in-vehicle battery to the rotary electric machine with priority. The control apparatus checks whether the computed external charge energy is sufficient to cover the estimated required energy. The control apparatus controls travel mode of the hybrid vehicle to the priority mode and a combined mode when a check result of the energy check means indicates that the computed external charge energy is sufficient and insufficient to cover the estimated required energy, respectively. The combined mode is a combination of the electric drive by the rotary electric machine and electric power generation, which is performed by the rotary electric machine to supplement insufficiency of energy by receiving drive force of the engine. The electric power generation is performed at locations in the planned travel route where efficiency of electric power generation by the rotary electric machine is higher than a predetermined value, and the electric drive is performed at other locations in the planned travel route in the combined mode.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
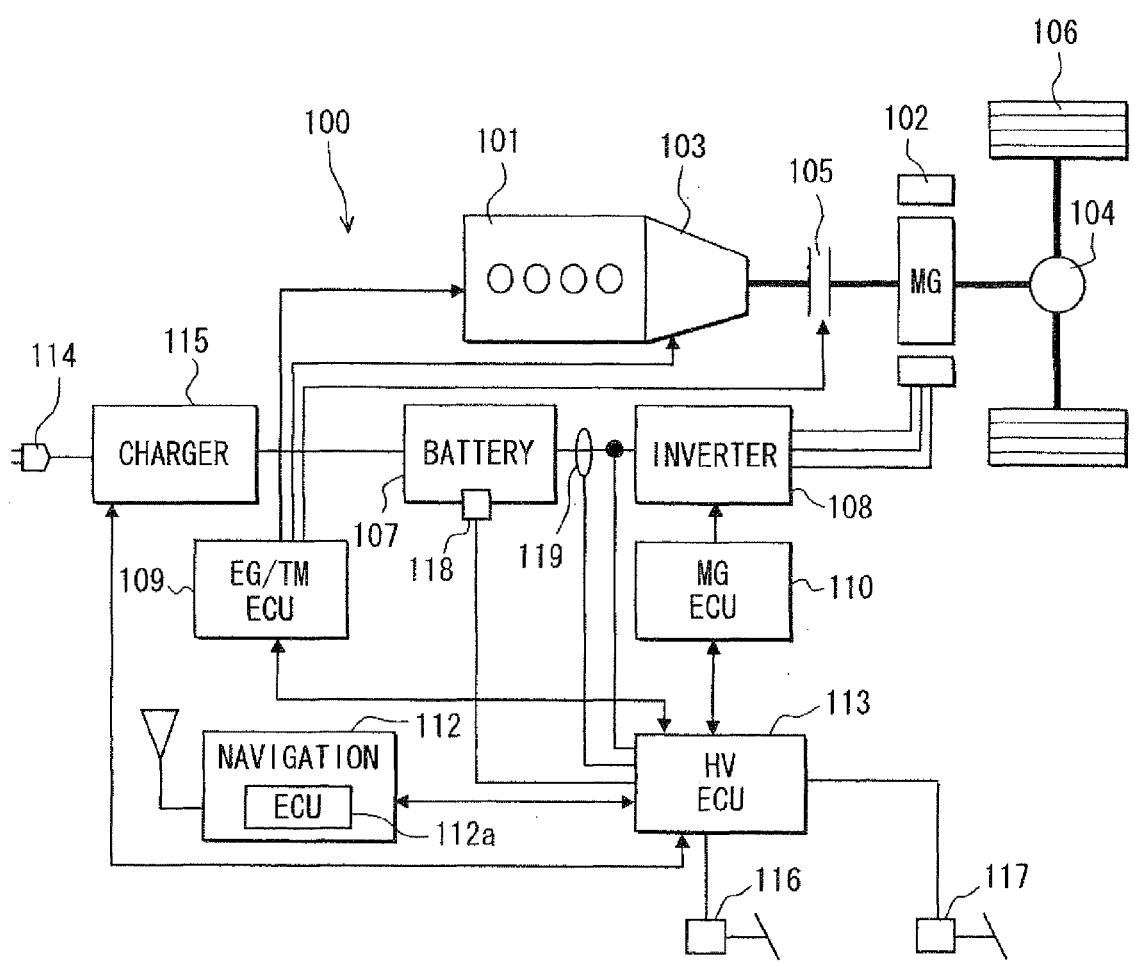
FIG. 1 is a schematic block diagram showing a control apparatus for a plug-in type hybrid vehicle according to an embodiment of the present invention.

The present invention will be described in detail with reference to one embodiment shown in FIG. 1, in which a plug-in hybrid vehicle is designated with reference numeral 100.

The vehicle 100 has an internal combustion engine 101 and a motor/generator (MG) 102, which is a rotary electric machine provided as a drive power source and operable as an electric motor and an electric power generator. The engine 101 and the MG 102 are connected in series to each other to transmit the drive power or brake force to drive wheels 106 through a differential 104.

A transmission 103 is provided to transmit rotation of its input shaft (output shaft of the engine 101) to its output shaft for driving the drive wheels 106 after changing the ratio of rotations between its input shaft and output shaft. A clutch 105 is provided between the transmission 103 and the MG 102, so that the clutch 105 engages and disengages the output shaft of the transmission 103 and a rotation shaft of the MG 102.

An in-vehicle battery 107 is, for example, a nickel-hydrogen battery or a lithium-ion battery. The MG 102 is connected to the battery 107 and a motor/generator electronic control unit (MG ECU) 110 through an inverter 108. The inverter 108 is for supplying electric power of the battery 107 to the MG 102 thereby to generate the drive power from the MG 102 operating as a motor. The inverter 108 is also for charging electric power generated by the MG 102 to the battery 107. The MG 102 generates the electric power as a generator, when it is driven to rotate with the drive power from the engine 101. The MG 102 also generates electric power, when it is driven to rotate with rotary drive power from the drive wheels 106. When the MG 102 is driven to generate the electric power with the drive power from the drive wheels 106, brake force is generated in accordance with the generated power.

The inverter 108 is configured to operate in response to command signals produced from the MG ECU 110. The MG ECU 110 detects a rotation speed of the MG 102 by using a rotation speed sensor such as a resolver. The MG ECU 110 is connected to a hybrid vehicle electronic control unit (HV ECU) 113 and configured to control the inverter 108 in response to a command signal produced from the HV ECU 113. Thus, the inverter 108 drives the MG 102 to generate the drive power or regenerative brake force in correspondence to the command signal applied from the HV ECU 113.

The HV ECU 113 is configured to determine a distribution ratio of drive power of the engine 101 and the MG 102 based on an operation amount of a driver on an accelerator pedal 116 and a travel speed by using a pre-stored power distribution ratio map data. The HV ECU 113 outputs drive power command signals to an engine-transmission electronic control unit (EG/TM ECU) 109 and the MG ECU 110. Each command signal to the MG ECU 110 and HV ECU 113 corresponds to a determined drive power distribution ratio.

The HV ECU 113 detects an operation amount of the driver on a brake pedal 117 based on, for example, hydraulic pressure of a master cylinder variable with the pressing force of the driver on the brake pedal 117, and determines required brake force based on the detected operation amount. The regenerative brake force is determined based on the pre-stored relation between the travel speed and the required brake force and outputs the command signal to the MG ECU 110 so that the determined regenerative brake force is generated. The regenerative brake force may alternatively be determined by a brake electronic control unit (not shown).

The HV ECU 113 acquires various operating conditions such as a rotation speed of the MG 102 from the MG ECU 110. The HV ECU 113 further acquires a temperature of the battery 117 detected by a temperature sensor 118, an input/output current of the battery 107 detected by a current sensor 119, and a voltage of the battery 107. The HV ECU 113 thus calculates accumulated electric energy based on these detected values in the known manner. The accumulated electric energy is indicated as remaining electric capacity or state of charge (SOC).

The EG/TM ECU 109 is configured to control the engine 101 and the transmission 103 based on a drive power command value produced from the HV ECU 113 and the travel speed of the vehicle 100 so that the drive power of the output shaft of the transmission 103 attains the drive power command value. If the drive power command value applied from the HV ECU 113 is positive, EG/TM ECU 109 engages the engine 101 and the MG 102 to each other by turning on the clutch 105. If the drive power command value applied from the HV ECU 112 is zero, the EG/TM ECU 109 disengages the engine 101 and the MG 102 from each other by turning off the clutch 105. Thus, dragging loss of the engine 101 and the transmission 103 is eliminated.

The battery 107 is connected to an electric charger 115, which charges the battery 107 with an external electric power source (commercial electric power for homes), when a charger connector 114 of the charger 115 is plugged in a commercial home electric power source outlet. Thus, the battery 107 is chargeable by the external power source external to the vehicle 100.

The HV ECU 113 is connected further to a navigation system 112 to communicate each other for transmission and reception of information therebetween. An electronic control unit (ECU) 112a of the navigation system 112 is configured to determine before starting travel whether the vehicle 100 is driven to travel in an EV priority mode (first travel control mode) or an EV-PG combined mode (second travel control mode). The HV ECU 113 responsively controls the travel of the vehicle 100 to travel in the mode determined by the navigation ECU 112a.

The EV priority mode indicates a control mode, that is, an electric drive mode, in which the vehicle 100 is driven by operating the MG 102 as a motor with priority. Specifically, electric power of the battery 107 is supplied to the MG 102 to generate the required drive power with priority. When the driver power of the MG 102 is still insufficient even if the MG 102 generates its maximum drive torque, the engine 101 is operated to supplement the deficiency of the drive power of the MG 102. The EV-PG combined mode indicates a control mode, in which the vehicle 100 is driven by selectively operating the MG 102 as a motor or a generator. Specifically, the MG 102 is operated to generate electric power in a travel area or section, in which the cost required for electric power generation by the MG 102 is less than a predetermined reference value. In other travel areas or sections, the MG 102 is operated to generate the drive power as in the EV priority mode.

Figure 2:
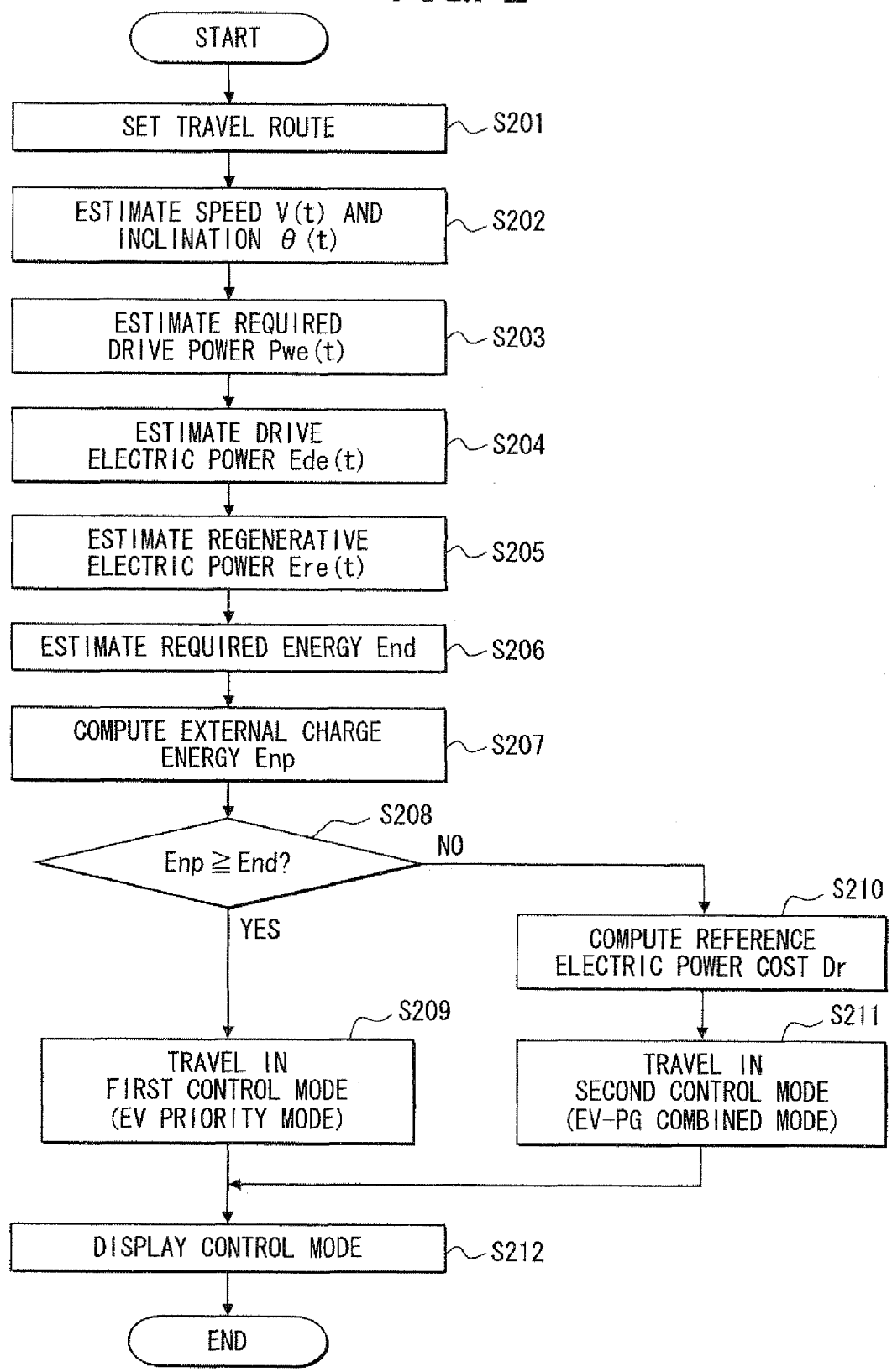
FIG. 2 is a flowchart showing main control processing executed by the control apparatus.

The main control for the EV priority mode and the EV-PG combined mode, which are performed by the navigation ECU 112a and the HV ECU 113 is shown in FIG. 2. Specifically the navigation ECU 112a executes S201 to S208 and S210, and the HV ECU 113 executes S209, S211 and S212. This routine may be executed after the charge connector 114 is plugged out from the commercial electric power outlet, that is, before the vehicle 100 starts to travel.

As shown in FIG. 2, S201 is executed first to set a planned travel route, which is planned or recommended for the travel to a destination. The planned travel route may be determined in the known manner. The destination may be set by a user or automatically based on a present location or date and time.

At S202 executed as travel condition estimating means, a travel speed V(t) of the vehicle 100 and an inclination θ(t) of the planned travel route set at S201 are estimated with respect to time t=ti (i=1 to n). "i" is an integer from 1 to n, and hence t1 to tn are time points, which is increased every predetermined time interval Δt (for example, 0.5 seconds) after the start of travel of the vehicle 100 on the planned travel route. The travel speed V(t) may be estimated based on the past data of travel speed stored in the navigation system 112 when the vehicle traveled the same route in the past at about the same time. It may alternatively be estimated based on traffic congestion information and past travel speed data of other vehicles stored in an external data server and acquired via radio communications with the external data server. The inclination θ(t) may be estimated based on inclination data stored in a map database of the navigation system 112 or acquired from the external data server via radio communications and the position of the vehicle at each time ti estimated from the travel speed V(t).

At S203, required driver power Pwe(t) is estimated with respect to each time t=ti based on the travel speed V(t) and the inclination θ(t) estimated at S202. This drive power Pwe(t) is estimated as required for driving the vehicle 100 to travel the planned travel route.

The estimated required drive power Pwe(t) is a product of a drive power and a travel speed. The drive power is represented as a sum of acceleration resistance, road surface resistance, air resistance and inclination resistance of the vehicle 100. Therefore, the estimated required drive power Pwe(t) is computed by the following equation (1).

$$Pwe(t)=[W \times acc(t)+\mu r \times W+\mu 1 \times A \times V(t) \times V(t)+W \times g \times \sin\theta(t)] \times V(t) \quad (1)$$

In the equation (1), W indicates vehicle total weight, acc(t) vehicle acceleration computed from the estimated travel speed V(t), μr rolling resistance coefficient, μ1 air resistance coefficient, A front projection area, g gravitational acceleration, and θ inclination.

At S204, drive electric power Ede(t) is estimated with respect to each time t=ti. This estimated drive electric power Ede(t) corresponds to electric power required for the MG 102 to produce all the required drive power Pwe(t) estimated at S203 within a range that it does not exceed the maximum drive torque of the MG 102.

The estimated drive electric power Ede(t) is computed by the following equation (2), if the estimated required drive power Pwe(t) is greater than zero (Pwe(t)>0).

$$Ede(t)=\min\{[(Pwe(t)+\text{Loss}mg(\omega mg(t), Tmg(t))], \\ [Tmaxd(\omega mg(t)) \times \omega mg(t)+\text{Loss}mg(\omega mg(t), Tmaxd(\omega mg(t)))]\} \quad (2)$$

In the equation (2), min (x, y) is a function that outputs smaller one of x and y. ωmg(t) is an angular velocity of the MG 102 at the estimated speed V(t) and may be computed as ωmg(t)=V(t)/rtire×R, in which rtire is a radius of a tire and R is a reduction ratio of the differential 104. Lossmg(ω, t) is a drive loss of the MG 102 when the rotation speed is ω and the torque is T (positive in drive direction) and may be determined with reference to data map provided in advance by experimental measurement. Tmaxd(ω) is a maximum torque of the MG 102 at the rotation speed ω and may also be determined with reference to data map provided in the similar manner.

If the estimated required drive power Pwe(t) is equal to or less than zero (Pwe(t)≦0), the estimated drive electric power Ede(t) becomes zero (Ede(t)=0), because the MG 102 is not required to generate the drive power for the vehicle 100.

At S205, regenerative electric power Ere(t) is estimated with respect to each time point t=ti. This estimated regenerative electric power Ere(t) corresponds to regenerative electric power required for the MG 102 to regenerate or restore the estimated required drive power Pwe(t) within a range that does not exceed the maximum absorbed torque of the MG 102. This estimated required drive power Pwe(t) is negative, when deceleration drive power is required for vehicle deceleration, that is, when the required drive power Pwe(t) estimated at S203 is negative. If the estimated drive power Pwe(t) is equal to or greater than zero (Pw≧0), the estimated regenerative electric power Ere(t) is zero because no electric power is regenerated. If the estimated drive power Pwe(t) is less than zero (Pwe(t)<0), the estimated regenerative electric power Ere(t) is computed by the following equation (3).

$$Ere(t)=\min\{[(-Pwe(t)-\text{Loss}mg(\omega mg(t), Tmg(t))], \\ [-Tmaxr(\omega mg(t)) \times \omega mg(t)-\text{Loss}mg(\omega mg(t), Tmaxr(\omega mg(t)))]\} \quad (3)$$

Here, Tmaxr(ω) is a torque of the MG 102 when the MG 102 absorbs a maximum of deceleration power at the rotation speed ω, and may be determined with reference to data map provided in advance. This torque Tmaxr(ω) takes a negative value, because the drive direction is set positive.

Figure 3:
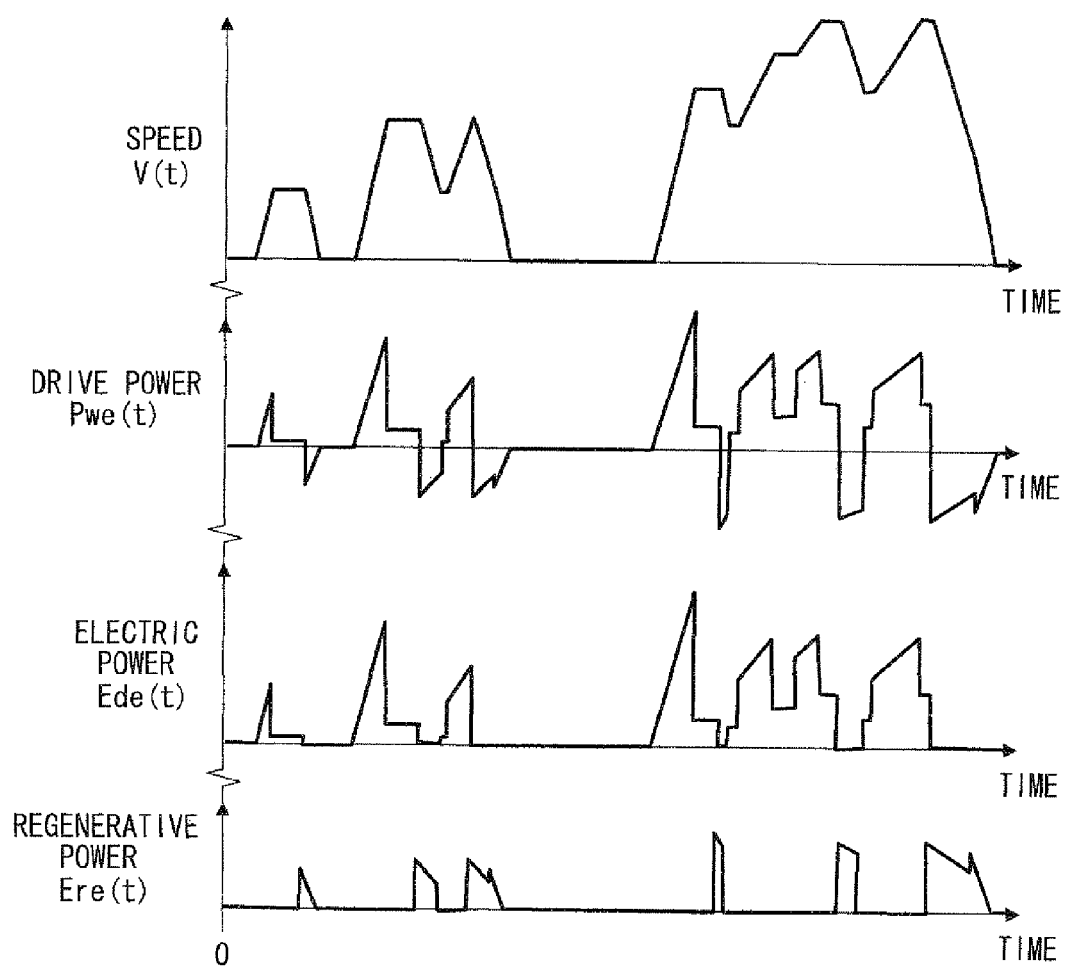
FIG. 3 is a time chart showing control operation performed by the control apparatus.

The estimated travel speed V(t), the estimated required drive power Pwe(t), the estimated drive electric power Ede(t) and the estimated regenerative electric power Ere(t) computed at S202 to S205 are shown exemplarily in FIG. 3. It is noted here that the estimated drive electric power Ede(t) is positive at time points when the estimated required drive power Pwe(t) is positive, and the estimated regenerative electric power Ere(t) is positive at time points when the estimated required drive power Pwe(t) is negative.

After S205, demand energy End is estimated at S206 executed as demand energy estimation means. This estimated demand energy End is computed by the following equation (4), in which "i" is an integer varying from 1 to n.

$$End=[\Sigma Ede(ti)-\Sigma Ere(ti)] \times \Delta t \quad (4)$$

As understood from the equation (4), the estimated demand energy End is computed by multiplying a value, which is produced by subtracting the estimated regenerative electric power Ere(t) of the entire planned travel route from the estimated drive electric power Ede(t) of the entire travel route, by the predetermined time interval Δt (0.5 seconds). Specifically, this estimated demand energy Ed corresponds to electric power, which cannot be restored by regeneration of the MG 102 within a performance range of the MG 102 (that is, within the range not exceeding the maximum absorbed drive torque of the MG 102), even if the MG 102 is driven to produce all the drive power required to travel the entire planned travel route within a performance range of the MG 102 (that is, within a range not exceeding the maximum drive torque of the MG 102).

At S207 executed as external charge energy computation means, external charge energy Enp, which has been charged by way of the charger 115 from the home electric power source external to the vehicle 100, is computed. This external charge energy Enp may be computed by adding an external charge energy ΔEnp charged at present after the last travel of the vehicle 100 to the previous external energy Enp remaining in the battery 107. This present external charge energy Enp is computed by the following equation (5). The external charge energy ΔEnp newly supplied after the last travel is determined by monitoring the operation condition of the charger 115 by the HV ECU 113 and integrating the energy charged by the charger 115.

$$Enp(\text{present}) = Enp(\text{previous}) + \Delta Enp \quad (5)$$

At S208 executed as energy check means, it is checked whether the present external charge energy Enp computed at S207 is equal to or greater than the estimated demand energy End computed at S206. If the external charge energy Enp is greater than the estimated demand energy End (S208: YES), it is estimated that the electric energy required to travel the planned travel route will be supplied by the external charge energy Enp. In this case, S209 is executed by the HV ECU 113 to perform the first control mode corresponding to the EV priority mode.

Figure 8:
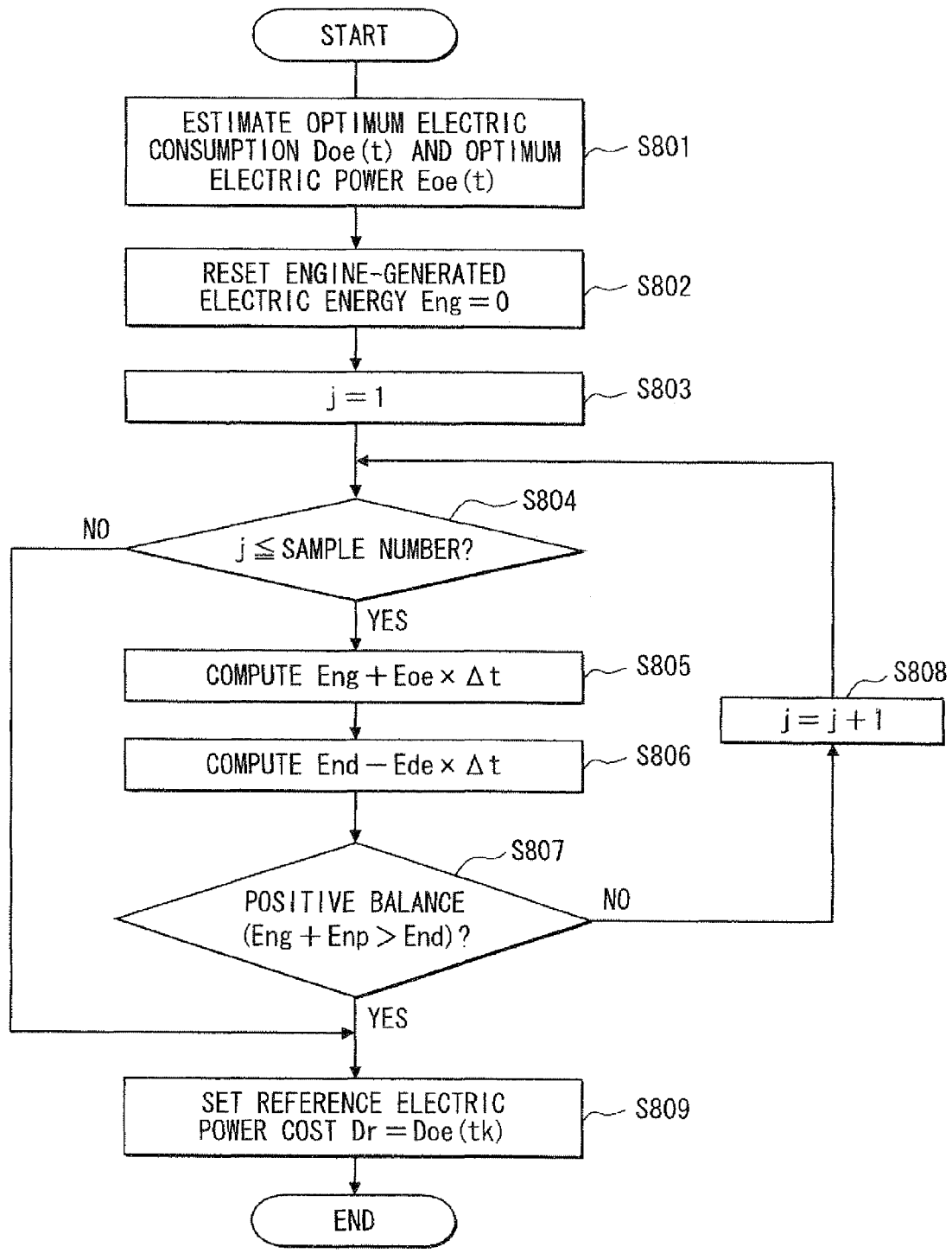
FIG. 8 is a flowchart showing processing for computing a reference electric power cost executed by the control apparatus.

If the external charge energy Enp is less than the estimated demand energy End (S208: NO), it is estimated that the electric energy required to travel the planned travel route will not be supplied by only the external charge energy Enp. In this case, at S210, a reference electric power cost Dr, which will be described in more detail with reference to FIG. 8, is computed as an index to determine whether the vehicle 100 is in a condition that the battery 107 is to be charged. Then S211 is executed by the HV ECU 113 to perform the second control mode corresponding to the EV-PG combined mode.

Figure 4A:
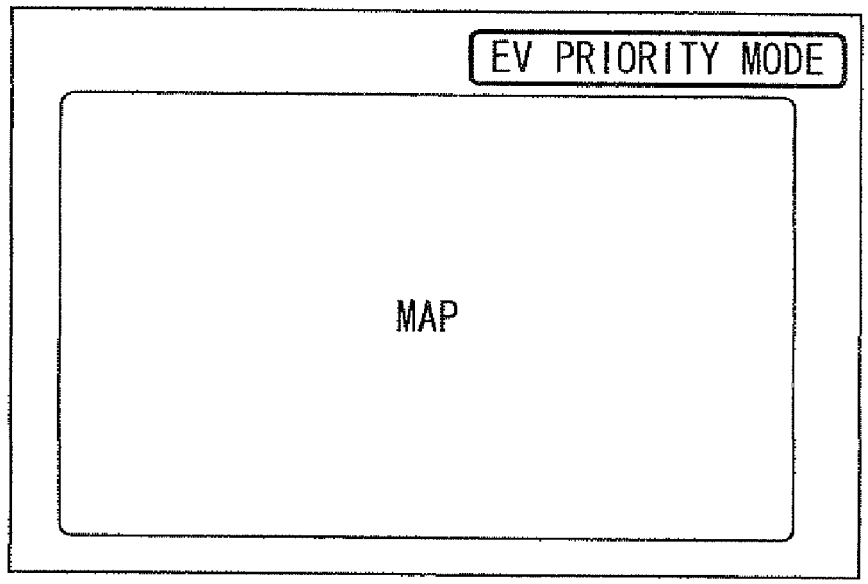
FIG. 4A and FIG. 4B are plan views showing display screens of a navigation system associated with the control apparatus, the display screens indicating an EV priority mode and EV-PG combined mode, respectively.
Figure 4B:
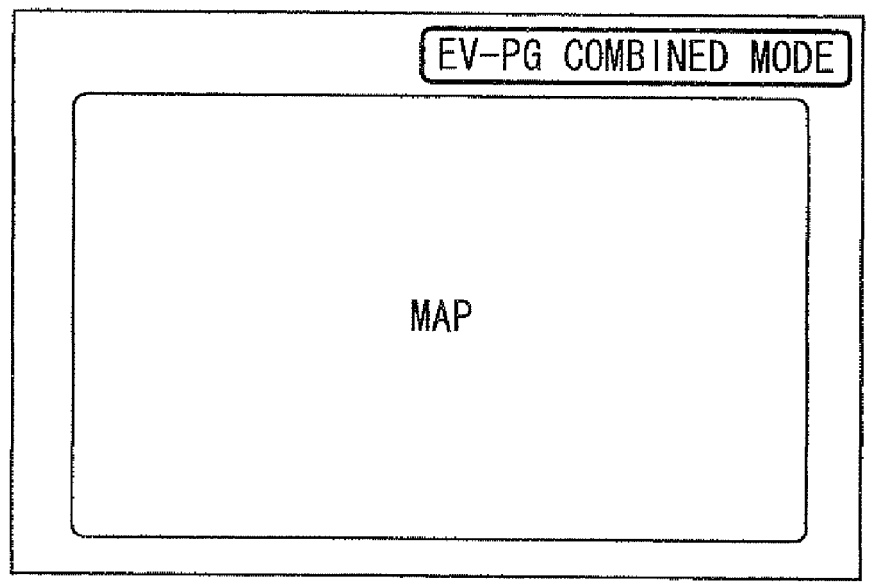

At S212, the navigation system 112 displays the mode performed by S209 or S211 on its display as exemplarily shown in FIGS. 4A and 4B, when S209 or S211 is started. Thus, the EV priority mode and EV-PG combined mode are indicated to a driver in the vehicle 100 in addition to map display as shown in FIGS. 4A and 4B, respectively.

The first control mode (EV priority mode) executed at S209 by HV ECU 113 is described in more detail with reference to FIG. 5.

First, at S501, a drive power Pw required to drive the vehicle 100 is computed based on the operation amounts of the accelerator pedal 116, brake pedal 117 and the travel speed V. More specifically, this required drive power Pw is determined by referring to pre-stored required drive torque map data defining a relation of required drive torque relative to the operation amounts of the accelerator pedal 116 and/or the brake pedal 117. Further, the rotation speed of the drive wheels 106 is computed based on the travel speed V, and the required drive power Pw is computed by multiplying the wheel rotation speed by the required drive torque. The drive power Pw is positive, when the vehicle 100 is driven to travel with this drive power Pw.

At S502, it is checked whether the required drive power Pw is equal to or greater than zero. If the required drive power Pw is greater (S502: YES) and less (S502: NO) than zero, S503 and S509 are executed, respectively.

At S503, the required drive power Pw computed at S501 is compared with a MGmax indicating maximum drive power of the MG 102, which the MG 102 can generate at present. This MG maximum drive power MGmax is determined by multiplying a maximum torque of the MG 102 by a present angular velocity of the MG 102. The maximum torque of the MG 102 is determined by referring to pre-stored map data defining a relation between the angular velocity of the MG 102 and the maximum torque of the MG 102. The MG maximum drive power MGmax is limited to an upper limit power, which is generated when the MG 102 is driven with the maximum output electric power of the battery 107. If the SOC of the battery 107 is less than a predetermined lower limit level, the MG maximum drive power MGmax is set to zero because the MG 102 cannot be driven with the electric power of the battery 107.

If the required drive power Pw is less than the MG maximum drive power MGmax (S503: YES), all the required drive power Pw can be generated by the MG 102. Therefore, at S504, command power Pe, which is to be generated by the engine 101, is set to zero. In this instance, the engine 101 is stopped by for example by cutting off fuel supply to the engine 101. After S504, command drive power Pmg, which is to be generated by the MF 102, is set to the required drive power Pw.

If the required drive power Pw is greater than the MG maximum drive power (S503: NO), the MG command drive power Pmg is set to the MG maximum drive power MGmax at S506. Then, at S507, the command drive power Pe is set to drive power (Pe=Pw−Pmg), which is a portion of the required drive power Pw that MG 102 cannot generate.

If the required drive power Pw is less than zero (S502: NO), that is, the vehicle 100 is to be braked, the command drive power Pe is set to zero at S509. At S510, the command drive power Pmg is set to the required drive power Pw. Since this drive power Pw is less than zero, this drive power results in brake power.

At S508 executed following S505, S507 or S510, the external charge energy Enp is updated. Specifically, if the required drive power Pw is greater than zero (S502: YES), the MG command drive power Pmg computed this time is subtracted from the external charge energy Enp. If the required drive power Pw is less than zero (S502: NO) and the power is generated by regeneration, it is assumed that a part of the external charge energy consumed by the MG 102 for the vehicle travel is restored In this case, the regenerated energy is added to the external charge energy Enp. Thus, at S508, the external charge energy Enp is updated by using the following equation (6), in which present Enp and previous Enp indicate the external charge energy computed this time and previous time, respectively.

$$Enp(\text{present}) = Enp(\text{previous}) - [Pmg + \text{Loss}mg(\omega mgn, Tmgn)] \quad (6)$$

Here, ωmgn is a present angular velocity of MG 102, and Tmgn=Pmg/ωmgn is present torque of MG 102. The minimum value of the external charge energy Enp is set to zero. The present external charge energy Enp(present) is set to zero, if the computed energy Enp(present) is negative.

At S511 following S508, the command drive power Pe for the engine 101 and the command drive power Pmg for the MG 102 are commanded to the EG/TIM ECU 109 and the MG ECU 110 from the HV ECU 113, respectively.

Figure 6:
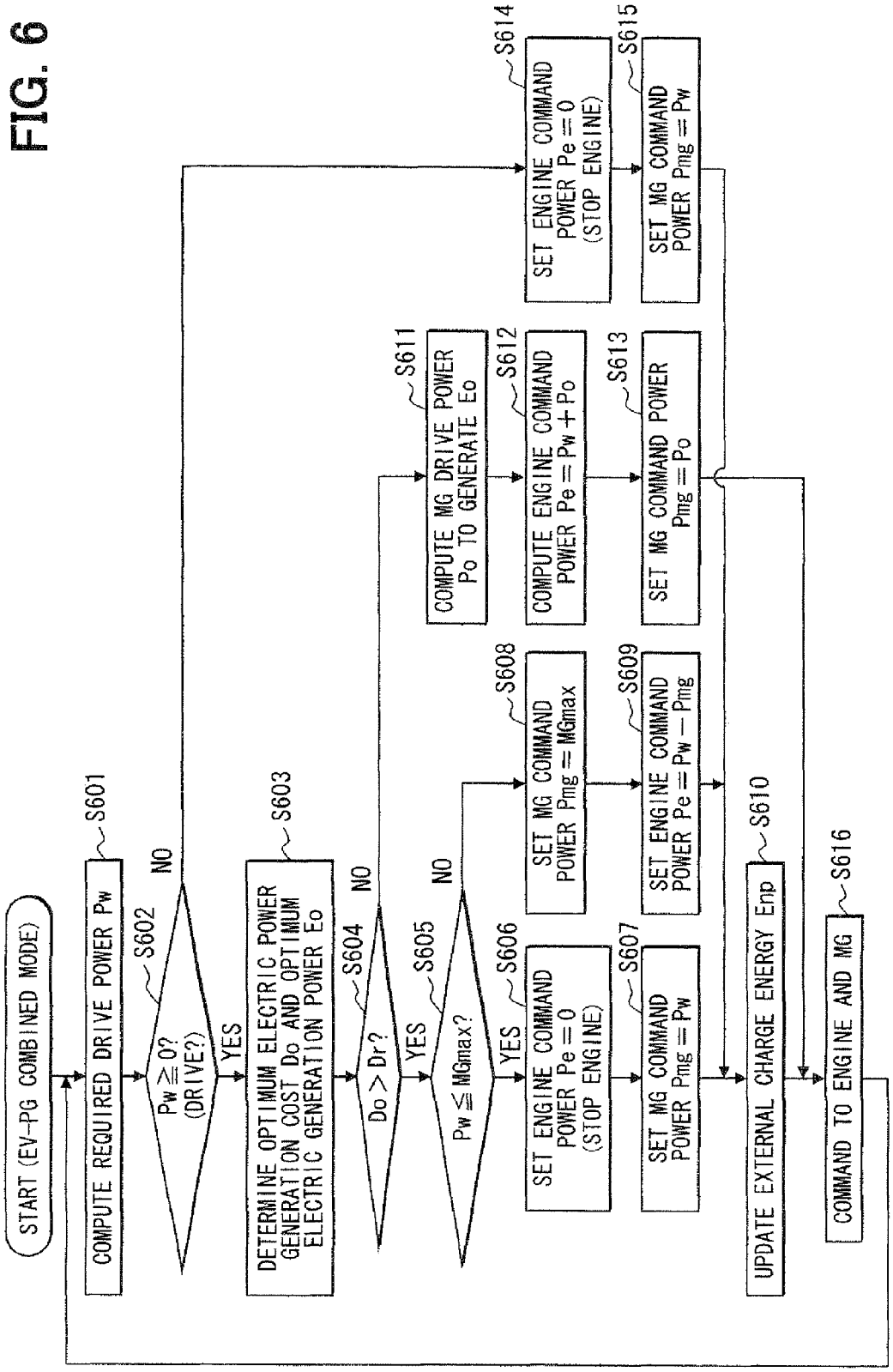
FIG. 6 is a flowchart showing processing for a second control mode (EV/EPG combined mode) executed by the control apparatus as a part of processing shown in FIG. 2.

The second control mode (EV-PG combined mode) executed at S211 in FIG. 2 is described in more detail with reference to FIG. 6.

Figure 5:
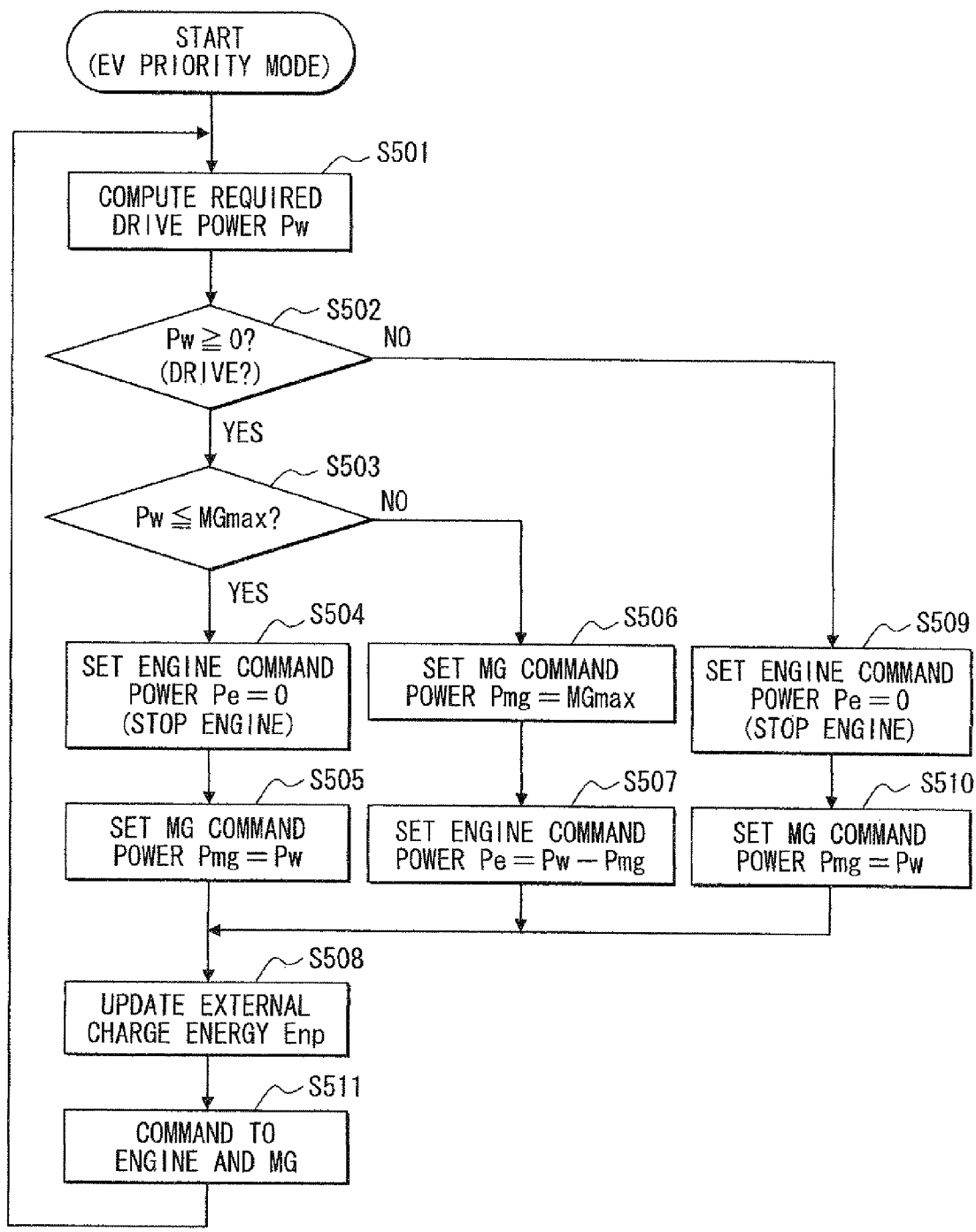
FIG. 5 is a flowchart showing processing for a first control mode (EV priority mode) executed by the control apparatus as a part of processing shown in FIG. 2.

At S601 and S602, the required drive power Pw is computed and compared with zero in the similar manner as in S501 and S502 of FIG. 5. At S603, electric power generation cost D under the present vehicle travel condition is computed, and optimum electric power generation cost Do and optimum electric generation power Eo are determined based on the computed electric power generation cost D.

It is noted that the electric power generation cost D is defined as a quotient computed by dividing a fuel increase amount ΔFg (grams/hour) by electric generation power Eg (kW). Here, the fuel increase amount ΔFg indicates an amount of increases in the fuel consumed by the engine 101 to generate the electric power by the MG 102 relative to the amount of fuel consumed by the engine 101 when no supply of electric power is made between the MG 102 and the battery 107 and no supply of drive power is made by MG 102, that is, relative to the amount of fuel consumed by the engine 101 to generate the drive power of the vehicle by only the engine 101.

The electric power generation cost D is a rate of fuel increase amount relative to the electric power supplied from the MG 102 to a power source system. Therefore, as the electric power generation cost D decreases, the amount of fuel consumed to generate unit electric power becomes less and the electric power generation becomes more efficient. For this reason, by computing the electric power generation cost D, the fuel cost corresponding to the fuel amount required for electric power generation can be quantatively computed. The power source system is formed by the battery 107 and devices operated with electric power from the battery 107.

As the amount of fuel increase varies with the electric generation power Eg, the relation between the electric power generation cost D and the electric generation power Eg is expressed by the following equation (7).

$$D(Eg) = (\text{fuel increase amount } \Delta Fg \text{ for electric power } Eg)/(\text{electric power } Eg) \quad (7)$$

The fuel increase amount ΔFg is computed as a difference (Fg1−Fg0) of fuel amounts Fg1 and Fg0. The fuel amount Fg1 indicates amount of fuel consumed at an operating point of the engine 101 and the MG 102 determined on an assumption that the drive power of a wheel axle is the required drive power Pw and the electric power to be supplied from the MG 102 to the power source system, that is, electric power generated by the MG, is Eg. The fuel amount Fg0 indicates amount of fuel consumed at an operating point of the engine 101 on an assumption that no electric power is generated by the MG 102 and the required drive power Pw is all generated by the engine 101.

Figure 7:
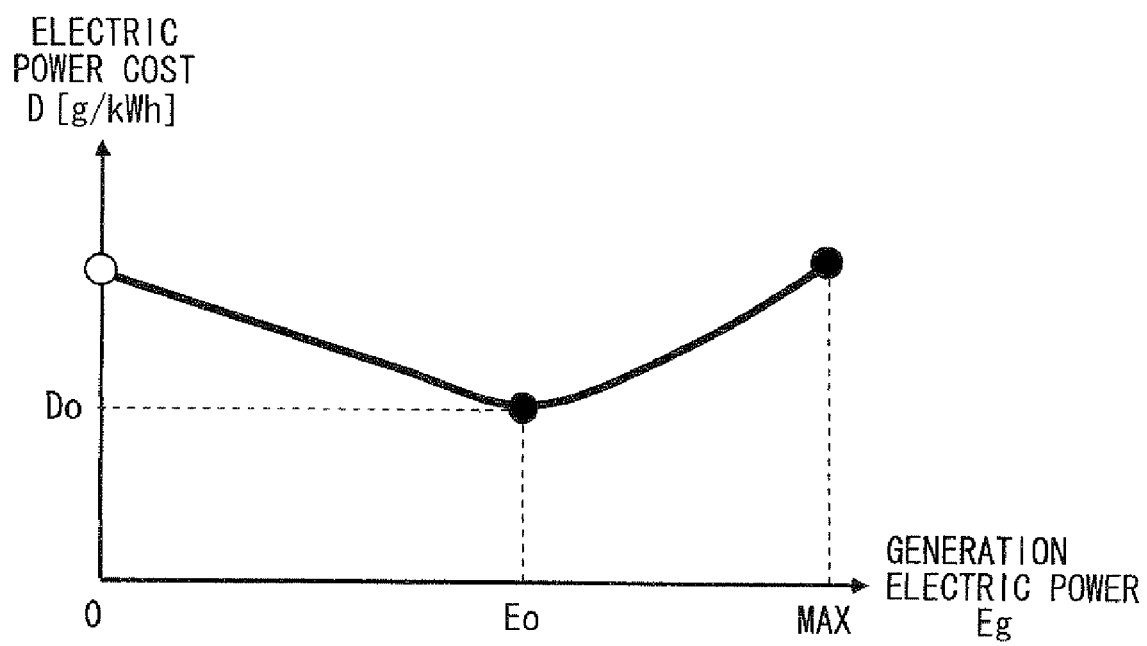
FIG. 7 is a graph showing a relation between electric generation power and electric power cost.

One exemplary relation between the electric power generation cost D and the electric generation power Eg generated by the MG 102 is shown in FIG. 7. The optimum electric power generation cost Do and the optimum electric generation power Eo are computed with reference to the characteristic relation shown in FIG. 7. As understood from FIG. 7, the maximum value of the electric generation power (maximum electric generation power) is smaller one of the maximum electric generation power and a predetermined maximum electric charge power of the battery 107 at the present rotation speed of the MG 102. The electric power generation cost D decreases first and then increases, when the electric generation power Eg generated by the MG 102 is increased from zero to the maximum. Since electric power generation cost D is preferred to be small as described above, the optimum electric power generation cost Do is set to the minimum value of the electric power generation cost D. The optimum electric generation power Eo is set in correspondence to the optimum electric power generation cost Do.

After determination of the optimum electric power generation cost Do and the optimum electric generation power Eo, it is checked at S604 whether the optimum electric power generation cost Do is greater than the reference cost Dr computed at S210.

If the optimum electric power generation cost Do is greater than the reference cost Dr (S604: YES), it means that it is impossible to generate electric power with cost less than the reference cost Dr. In this case, S605 to S609 are executed in the same manner as S503 to S508 executed in the EV priority mode. S605 to S610 correspond to S503 to S508, respectively.

If the optimum electric power generation cost Do is less than the reference cost Dr (S604: NO), it means that it is possible to generate electric power efficiently with cost less than the reference cost Dr.

In this case, S611 is executed to compute drive power (MG generation power) Po required to generate the optimum electric power Eo by the MG 102 is computed by the following equation (8).

$$Po = \omega mgn \times Tmg\text{map}(\omega mgn, Imgopt) \quad (8)$$

Here, Tmgmap (ω, I) is MG electric generation power relative to the rotation speed ω and the power generation current I, and may be determined with reference to map data provided in advance. Imgopt is computed by dividing the optimum energy Eo by the battery voltage B.

At S612, the engine command power Pe is computed by adding the required drive power Pw and the MG generation drive power Po. Thus, the engine 101 generates the total drive power, which is required to drive the vehicle 100 for travel and the MG 102 for electric power generation.

At S613, the command drive power Pmg is set to −1×Po. It is noted that the polarity of the drive power Pmg is inverted because the power Po for the electric power generation by the MG 102 is positive and the command drive power Pmg for the electric power generation by the MG 102 is negative. Following S613, S616 is executed without executing S610 because the external charge power Enp does not change.

If the required drive power Pw is less than zero (S602: NO), S614 and S615 are executed in the same manner as S509 and S510. After S610 or S613, S616 is executed to command the engine drive power Pe and the MG command drive power Pmg to the EG/TM ECU 109 and the MG ECU 110.

The reference electric power cost Dr computed at S210 (FIG. 2) is executed as shown in FIG. 8.

At S801 operating as estimated cost index determination means, optimum electric power generation cost Doe(t) and optimum electric generation power Eoe(t) are estimated with respect to each future time t=ti (i=1 to n) based on the travel speed V(t) estimated at S202 and the required drive power Pwe(t) estimated at S203.

The estimated optimum electric power generation cost Doe and the estimated optimum electric generation power Eoe are different from each other only in respect that either one of a present value (actual value) and a future estimated value is used. These are computed in the same method as the computations of the optimum electric power generation cost Do and the optimum electric generation power Eo executed at S603. Therefore, no more detailed description will be necessary.

Figure 9:
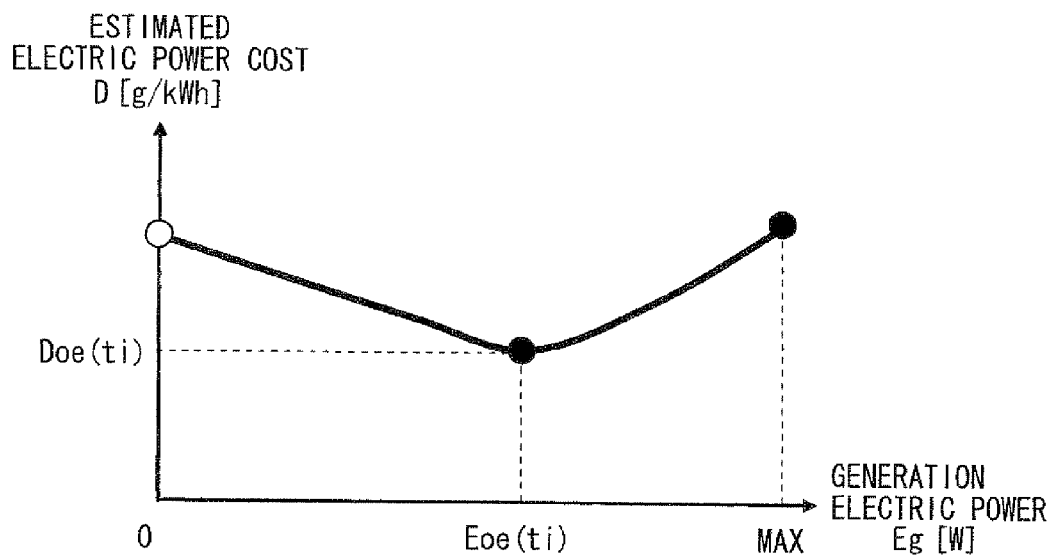
FIG. 9 is a graph showing a relation between estimated electric generation power and estimated electric power cost.
Figure 10:
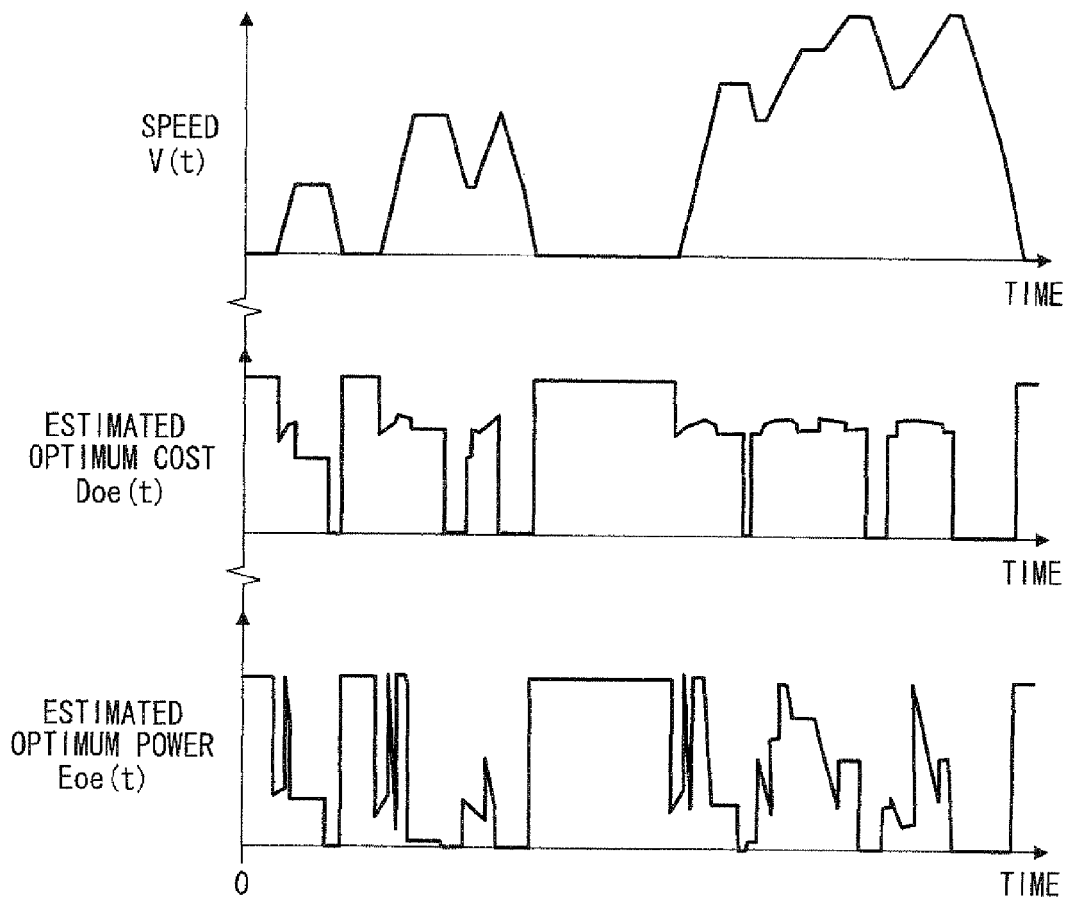
FIG. 10 is a time chart showing control operation performed by the control apparatus.

The relation between the estimated electric power generation cost D(ti) and the estimated electric generation power Eg(ti) is shown in FIG. 9. Based on this relation, a minimum value of the estimated optimum electric power generation cost D is set as the estimated optimum electric power generation cost Doe(ti), and the estimated electric generation power corresponding to the power generation cost Doe(ti) is set as the estimated optimum electric power generation power Eoe(ti). As shown in FIG. 10 exemplarily, the relation of the estimated optimum electric power generation cost Doe(t) and the estimated optimum electric generation power Eoe(t) determined as above varies with respect to the travel speed V(t).

At S802, the electric power generation energy Eng, which indicates the electric energy produced by the MG 102 by being driven by the engine 101 is reset to zero (Eng=0). This electric power generation by the engine drive power is referred to as engine generation. Then, index variable j is reset to 1 at S803.

At S804, it is checked whether the index variable j is equal to or less than a sample number (sample time number), which is determined by dividing an estimated travel time of a travel route by a sample time Δt. If the index variable j is greater than the sample number (S805: NO), S809 is executed. If it is equal to or less than the sample number (S805: YES), S805 is executed.

At S805, time t=tk, at which the estimated optimum electric power cost Doe is the j-th smallest, is found to assume that the electric power is generated by using the engine 101 at time t=tk. The energy (Eoe(tk)×ΔT), which is estimated at time t=tk to be produced by operating the engine 101 for the estimated optimum electric generation power Eoe(tk), is added to the generated electric energy Eng.

At S806, the estimated drive electric power Ede(tk)×ΔT at time t=tk is subtracted from the estimated required energy End. If electric power is assumed to be generated at t=tk, the MG 102 is not used as the drive power source at this time. It thus becomes unnecessary to supply electric power (energy) from the battery 107 to the MG 102 to drive the MG 102. Therefore, this subtraction is made.

At S807, it is checked whether the total balance of energy over the travel is positive. The total balance of energy is a result of increase of the generated electric energy Eng at S805 and decrease of the estimated required energy End at S806. Specifically, it is checked whether a sum (Eng+Enp) of the electric generation power Eng and the external energy Enp is greater than the estimated required energy End.

If the balance is negative (S807: NO), the variable j is incremented by one at S808 and then S804 is executed. If the variable j is still less than the sample number (S804: YES), the generated electric energy Eng is increased at S805 and the estimated required energy End is decreased (S806).

If the balance is positive (S807: YES), S809 operating as reference cost index determination means is executed to set the reference electric power cost Dr to the estimated optimum electric power generation cost Doe(tk), which is the j-th smallest among the optimum electric power generation costs Doe(tk) estimated at time t=tk.

By setting the reference electric power cost Dr, the electric power is generated by using the engine 101 only when it is possible to generate the electric power at the electric power cost D, which is less than the reference electric power cost Dr. At other times, the same control as the first control mode can be performed. Therefore, in the second control mode shown in FIG. 6, the electric power is generated by using the engine 101 only when the electric power cost D is less than the reference electric power cost Dr.

Further, since the engine 101 is used to generate electric power only when the electric power cost D is less than the reference electric power cost Dr, the engine 101 can be used to generate electric power in an interval, in which electric power is generated with less fuel consumption. That is, it is irrelevant whether such an interval is in the former part or the latter part of the planned travel route. Thus, costs for driving a vehicle can be reduced effectively.

The present invention should not be limited to the disclosed embodiment but may be implemented in many other embodiments.

What is claimed is:

1. A control apparatus for a hybrid vehicle, which has an engine and a rotary electric machine as drive power sources, and an in-vehicle battery for supplying and receiving electric power to and from the rotary electric machine, the in-vehicle battery being chargeable with electric power by an external electric power source external to the hybrid vehicle, the control apparatus comprising:
    external charge energy computation means configured to compute external charge energy supplied as electric power from the external electric power source;
    estimated required energy computation means configured to compute estimated required energy estimated as required for the hybrid vehicle to travel a planned travel route in a priority mode, in which electric drive of the hybrid vehicle is performed by the rotary electric machine by supplying the electric power from the in-vehicle battery to the rotary electric machine with priority;
    energy check means configured to check whether the computed external charge energy is sufficient to cover the estimated required energy;
    mode control means configured to control travel mode of the hybrid vehicle to the priority mode and a combined mode when a check result of the energy check means indicates that the computed external charge energy is sufficient and insufficient to cover the estimated required energy, respectively;
    the combined mode being a combination of the electric drive by the rotary electric machine and electric power generation, which is performed by the rotary electric machine to supplement insufficiency of energy by receiving drive force of the engine; and
    the electric power generation being performed at locations in the planned travel route where efficiency of electric power generation by the rotary electric machine is higher than a predetermined value, and the electric drive being performed at other locations in the planned travel route in the combined mode.

2. The control apparatus according to claim 1, wherein:
    a cost index indicating cost required to perform the electric power generation by using the engine in the combined mode is computed each time; and
    the electric power generation is allowed only when the cost index is less than a predetermined reference cost index.

3. The control apparatus according to claim 2, further comprising:
    travel condition estimation means configured to estimate, with respect to each travel time interval, a travel condition including a travel speed of the hybrid vehicle and inclination of the planned travel route;
    estimated cost index determination means configured to determine the cost index as an estimated cost index in accordance with the travel condition with respect to each travel time interval; and
    reference cost index determination means configured to determine the predetermined reference cost index in accordance with the estimated cost index determined with respect to each travel time interval.

4. The control apparatus according to claim 3, wherein:
the reference cost index computation means is configured to determine an order of the electric power generation from a least one of the estimated cost indices determined with respect to each travel time interval, and determine, as the reference cost index, a greatest one of the estimated cost indices computed with respect to each travel time interval corresponding to the electric power generation by using the engine when a sum of electric power generated by the electric power generation exceeds insufficiency of energy.

5. The control apparatus according to claim 2, wherein:
the cost index is computed by dividing, by electric power generated by the electric power generation by using the engine, a difference between a fuel amount consumed by the engine when the hybrid vehicle is driven by the engine with the rotary electric machine generating no drive power nor electric power and fuel amount consumed by the engine when the hybrid vehicle is driven with the rotary electric machine performing the electric power generation by using the engine.

6. The control apparatus according to claim 2, wherein:
a minimum value of the cost index is determined with reference to a predetermined relation and the rotary electric machine is driven by the engine to generate electric power corresponding to the minimum value of the cost index, the predetermined relation defining the cost index relative to the electric power generated by the rotary electric machine by using the engine.

7. The control apparatus according to claim 1, further comprising:
mode indication means configured to indicate the control mode, which is performed, to a driver.

8. The control apparatus according to claim 1, wherein:
the external charge energy computation means is configured to update the external charge energy during travel of the hybrid vehicle, by subtracting from the external charge energy of the in-vehicle battery used for the rotary electric machine to generate the drive power and by adding to the external charge energy electric power corresponding to regenerative brake force.

* * * * *